United States Patent
Noy

Patent Number: 5,519,852
Date of Patent: May 21, 1996

[54] METHOD FOR TRANSFERRING DOCUMENTS

[75] Inventor: Amir Noy, Herzlia, Israel

[73] Assignee: Scitex Corporation, Limited, Herzlia Bet, Israel

[21] Appl. No.: 328,223

[22] Filed: Oct. 25, 1994

[30] Foreign Application Priority Data

Nov. 18, 1993 [IL] Israel .......................................... 107657

[51] Int. Cl.$^6$ ..................................................... G06F 13/42
[52] U.S. Cl. .................. 395/500; 364/240.8; 364/940.81
[58] Field of Search ........................................ 395/500, 200

[56] References Cited

U.S. PATENT DOCUMENTS

| | | | |
|---|---|---|---|
| 4,648,061 | 3/1987 | Foster | 395/200 |
| 4,899,306 | 2/1990 | Green | 395/500 |
| 5,261,095 | 11/1993 | Crawford | 395/650 |
| 5,410,723 | 4/1995 | Schmidt | 395/800 |

Primary Examiner—David Y. Eng
Attorney, Agent, or Firm—Skjerven, Morrill, MacPherson, Franklin & Friel

[57] ABSTRACT

The present invention is a protocol by which document handlers, document creators and output devices can communicate desired document attributes and available document handling capabilities to each other. If the available capabilities do not match the desired ones, the protocol provides the ability to change the desired capabilities so as to match what is available. The protocol also provides the ability to question a device as to its available capabilities. For output devices, the protocol enables a document handler to first provide a list of desired document handling capabilities to an output device and to receive information regarding whether or not the output device has the desired handling capabilities. Only once the document handling capabilities of the output device are acceptable may document data be sent. For document creators, the protocol enables a document handler to first provide a list of desired document attributes to a document creator and to receive information regarding whether or not the document creator can produce a document with the desired attributes. Only once the document attributes are acceptable is the document creator permitted to send the document data.

7 Claims, 6 Drawing Sheets

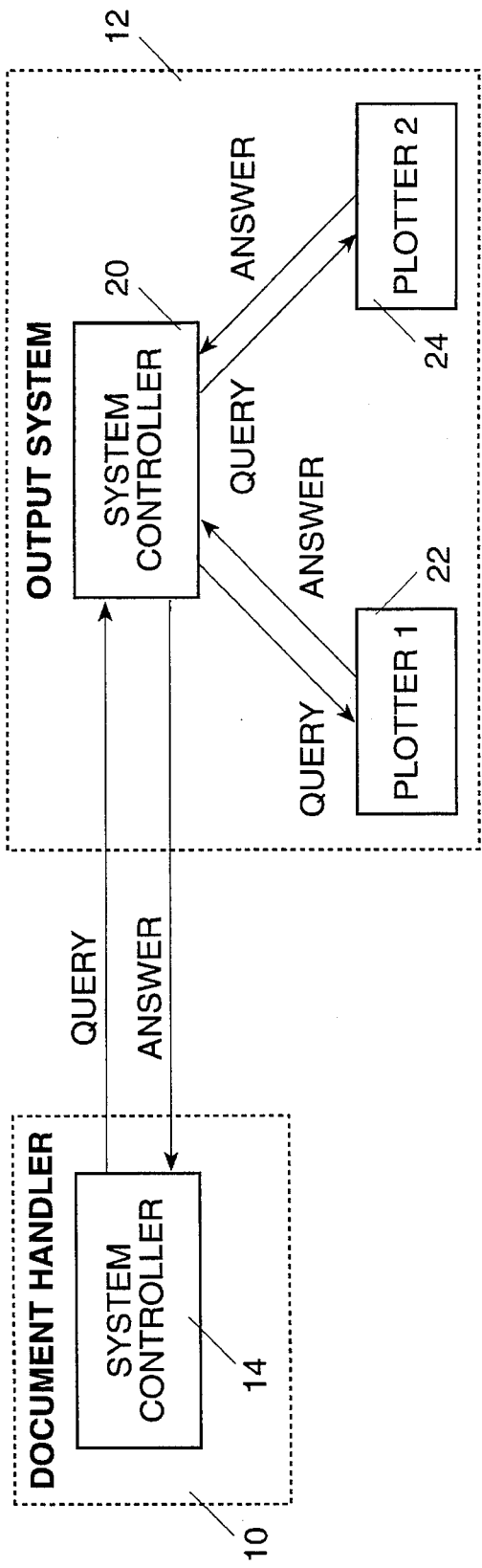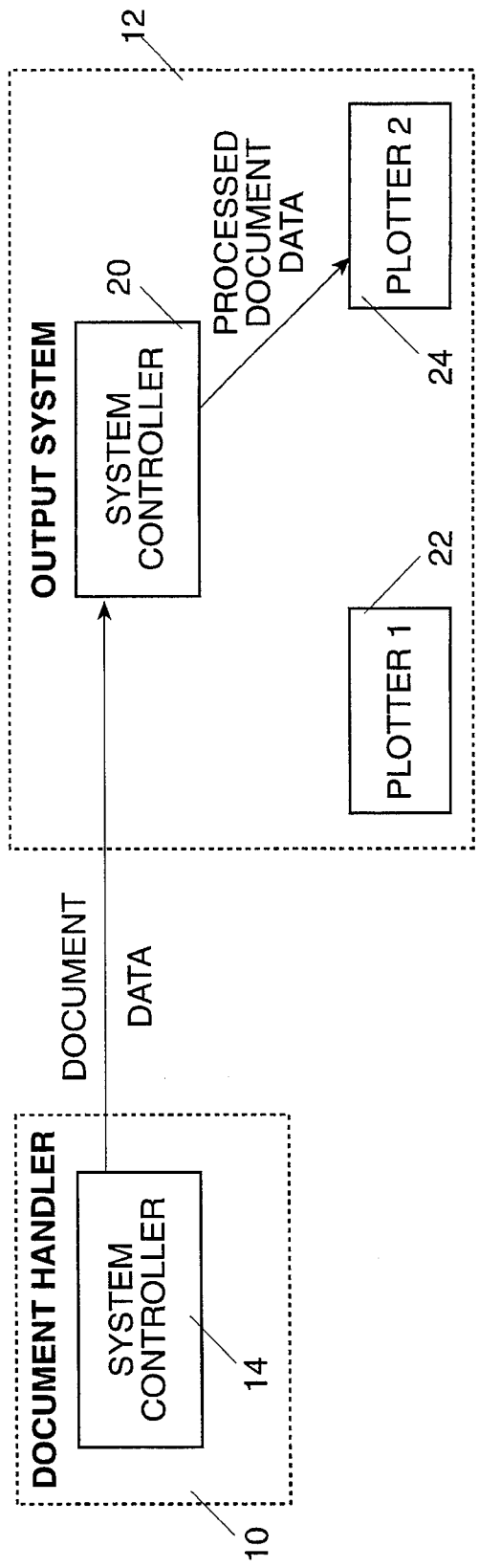

METHOD FOR TRANSFERRING DOCUMENTS

FIELD OF THE INVENTION

The present invention relates to a protocol for document handling.

BACKGROUND OF THE INVENTION

As the word processing, graphics and desk-top publishing fields have grown, so have the variety of ways to describing a document to be produced on an output device, such as a plotter or printer. A document can be a raster image, a vector drawing, a collection of text, any combination of the three, etc. Exemplary output devices are color electronic pre-press systems (CEPS), desk-top publishing (DTP) systems, imaging input/output devices, such as scanners, plotters, printers, still video cameras, frame grabbers, etc.), graphic accelerators, image compression hardware and software, raster image processors (RIP), facsimile machines, color equalizing devices, word processing applications and graphics applications.

The person who creates the document, usually within application software, typically defines it so that when it is physically produced, it will look the way he wants it to. However, each output device typically has a range of document attributes which it can handle. For example, a plotter may have the document handling capabilities for the following document attributes: A4–B4 sizes of paper, 24 bit color, and 600 dots per inch (dpi) resolution. A facsimile machine may be able to print black and white on A4 paper at 200 dpi resolution.

The system where the document currently resides, herein termed a "document handler", presently can only provide documents to certain output devices, whose document handling capabilities are known to the document handler and which match the document attributes which the document handler provides. The document handler is thus "configured" to work with the output device. If a new output device is purchased, the document handler must be reconfigured to work with the new output device.

The same problem holds at the sub-system level. If a new piece of hardware, such as a color printer, is connected into an existing document handler, the document handler, and the applications which it runs, must be reconfigured to provide them with knowledge of the capabilities of the new piece of hardware.

The problem is not that the input and output devices cannot communicate with each other in the sense of providing the data of the document to each other (this they typically do according to standard communication protocols), but that the output device cannot always produce the document as desired.

This problem also exists between document handlers and "document creators", such as scanners, frame grabbers, and other document creating devices. For example, if the document creator produces large documents (typically images) and the document handler does not have a large storage unit, then the document handler cannot store the produced document. The same holds true if the document creator produces the documents in a format, or compression algorithm, which the document handler does not utilize.

SUMMARY OF THE PRESENT INVENTION

It is therefore an object of the present invention to provide a document handling protocol. For the purposes of the present discussion, we define the following terms:

Document: any collection of data which has associated with it document attributes.

Internal document attribute: a variable describing an aspect of a document which is defined within the document, be it its output format (font, paper size, number of separations, paper type, etc.), its page description language, the method used to compress it, etc.

External document attribute: a variable describing an aspect of the document or its production which is typically defined by an operator, such as the time allotted for printing or creating the document, the resolution if the document is an image, etc.

Internal document attributes, such as paper size and type, can also be externally defined and external document attributes can also be defined within a document.

Document creator: a device which produces a file having a document therein.

Output device: a device which produces a physical, formatted version of the document.

Document handler: a device which handles a document but neither creates nor outputs it.

Document handling capability: a capability of an output device which can handle a document attribute, whether internal or external. For example, one capability might be the ability to understand a certain page description language, or to print a certain font.

The present invention is a protocol by which document handlers, document creators and output devices can communicate desired document attributes and available document handling capabilities to each other. If the available capabilities do not match the desired ones, the protocol provides the ability to change the desired capabilities so as to match what is available. The protocol also provides the ability to question a device as to its available capabilities.

For output devices, the protocol enables a document handler to first provide a list of desired document handling capabilities to an output device and to receive information regarding whether or not the output device has the desired handling capabilities. Only once the document handling capabilities of the output device are acceptable may document data be sent.

For document creators, the protocol enables a document handler to first provide a list of desired document attributes to a document creator and to receive information regarding whether or not the document creator can produce a document with the desired attributes. Only once the document attributes are acceptable is the document creator permitted to send the document data.

There is therefore provided, in accordance with a preferred embodiment of the present invention, a method for transferring documents from a first system to a second system, wherein each document comprises document data and document attributes. The method includes the steps of a) in the first system, forming a query comprising a list of document handling capabilities desired in the second system, wherein at least some of the document handling capabilities correspond to the document attributes, b) sending said query from the first to the second system and c) in the second system, determining what the document handling capabilities of the second system are and providing a response indicating whether or not the second system has the desired document handling capabilities.

Additionally, in accordance with a preferred embodiment of the present invention, if the response is negative, the method also includes the steps of forming a further query comprising a further list of document handling capabilities corresponding to a fallback set of document attributes and repeating the steps of sending and determining.

Moreover, in accordance with a preferred embodiment of the present invention, the steps of forming a further query and of repeating are repeated until the response is positive or until no further fallback attributes exist.

Further, in accordance with a preferred embodiment of the present invention, the response also includes a list of document handling capabilities of the second system as determined in the step of determining.

Still further, in accordance with a preferred embodiment of the present invention, the method also includes the step of sending the document from the first system to the second system if the response is positive.

Additionally, in accordance with a preferred embodiment of the present invention, the second system comprises a system controller and at least one subsystem and the steps of forming, sending, and determining are performed between the system controller and each subsystem.

There is additionally provided, in accordance with a preferred embodiment of the present invention, a method for inputting documents from a second system to a first system. The method includes the steps of a) in the first system, forming a query comprising a list of the document attributes desired to be produced by the second system, b) sending the query from the first to the second system and c) in the second system, determining what document attributes the second system can produce and providing a response indicating whether or not the second system can produce the desired document attributes.

As in the method of transferring documents, if the response is negative, a further query is formed, this one including a list of fallback document attributes.

BRIEF DESCRIPTION OF THE DRAWINGS AND APPENDIX

The present invention will be understood and appreciated more fully from the following detailed description taken in conjunction with the drawings in which:

FIGS. 1A and 1B are block diagram illustrations of "output" communication, between a document handler and an output device, for the purposes of producing a physical version of a document, in accordance with a preferred embodiment of the method of the present invention, wherein FIG. 1A illustrates a mode of determining capabilities and FIG. 1B illustrates sending the document data;

FIG. 2A illustrates the operation of the sending unit and FIG. 2B illustrates the operation of the receiving unit;

Figure 3:
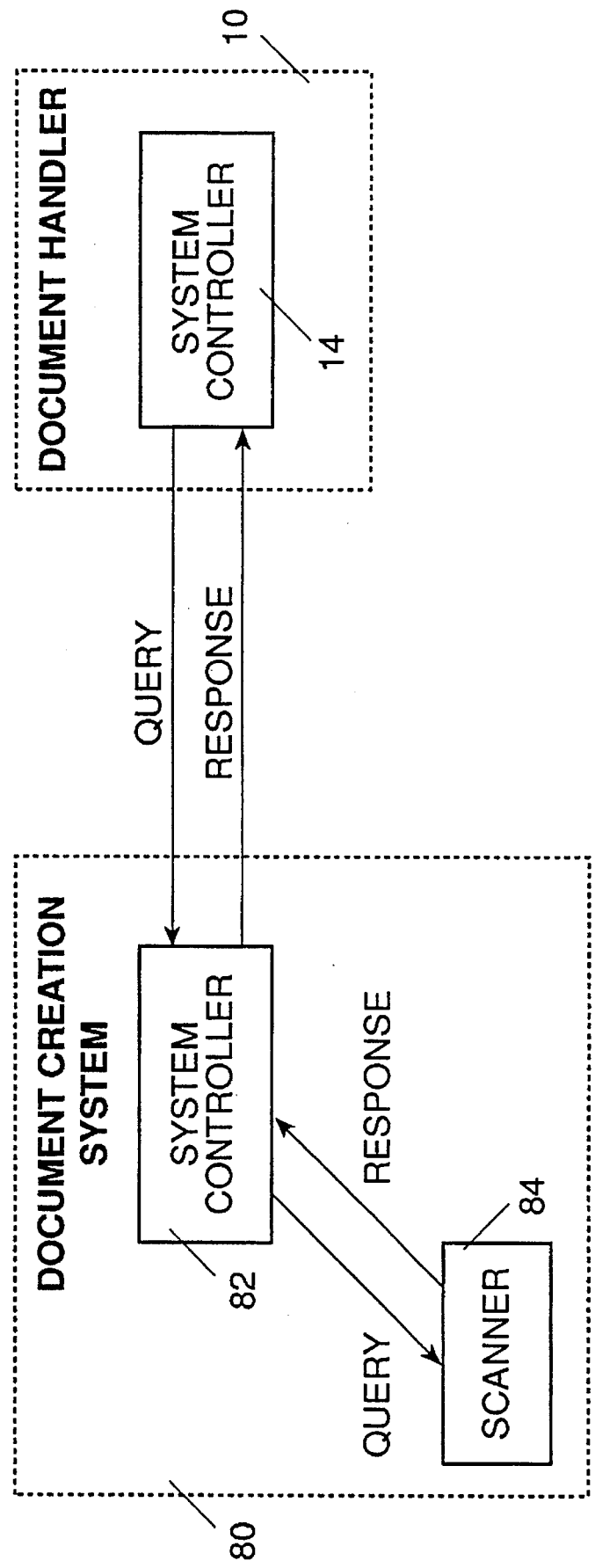
FIG. 3 is a block diagram illustration of "input" communication, between a document handler and a document creator, for the purposes of inputting a digital version of a document, in accordance with a preferred embodiment of the method of the present invention.
Figure 4A:
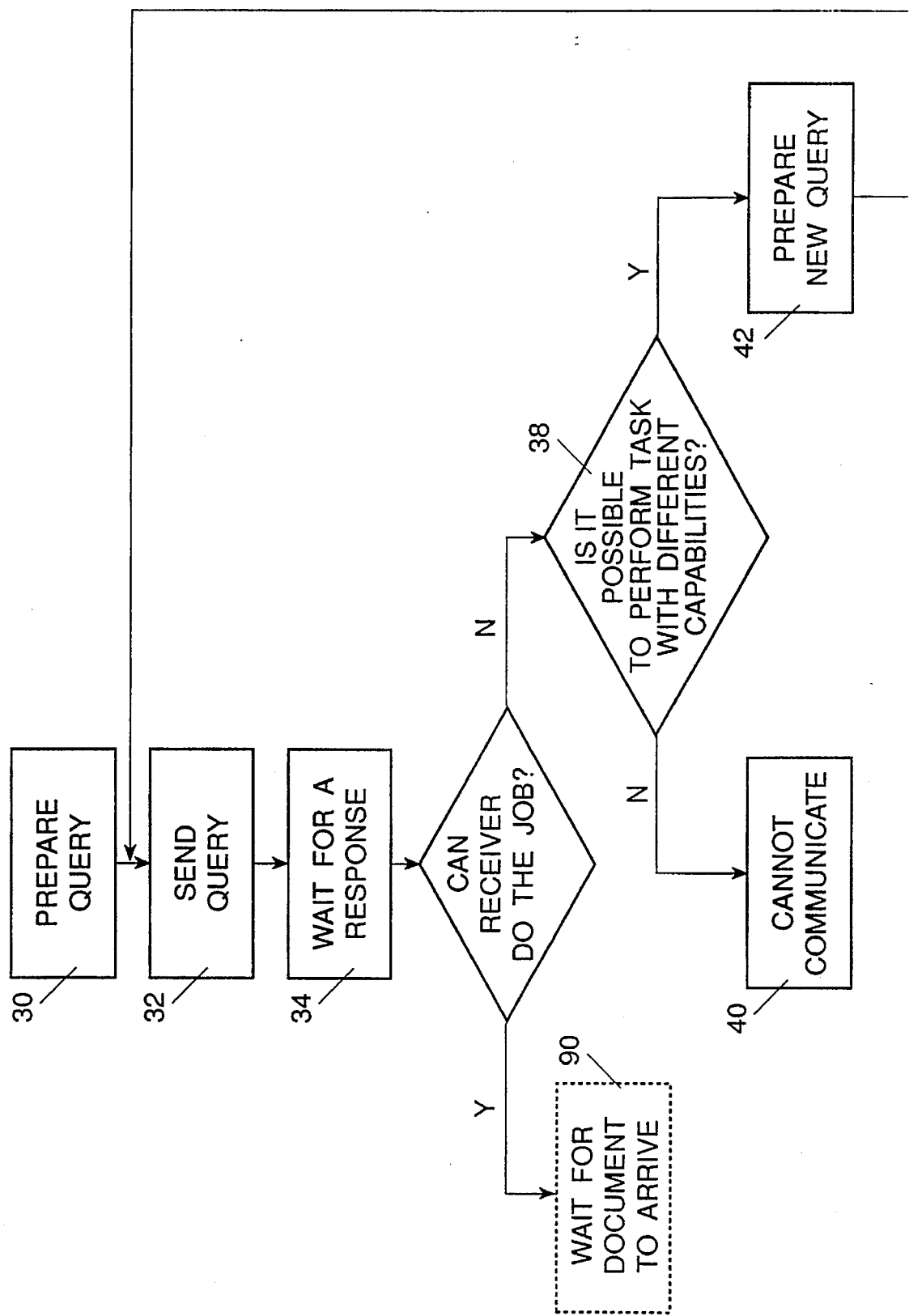
Figure 4B:
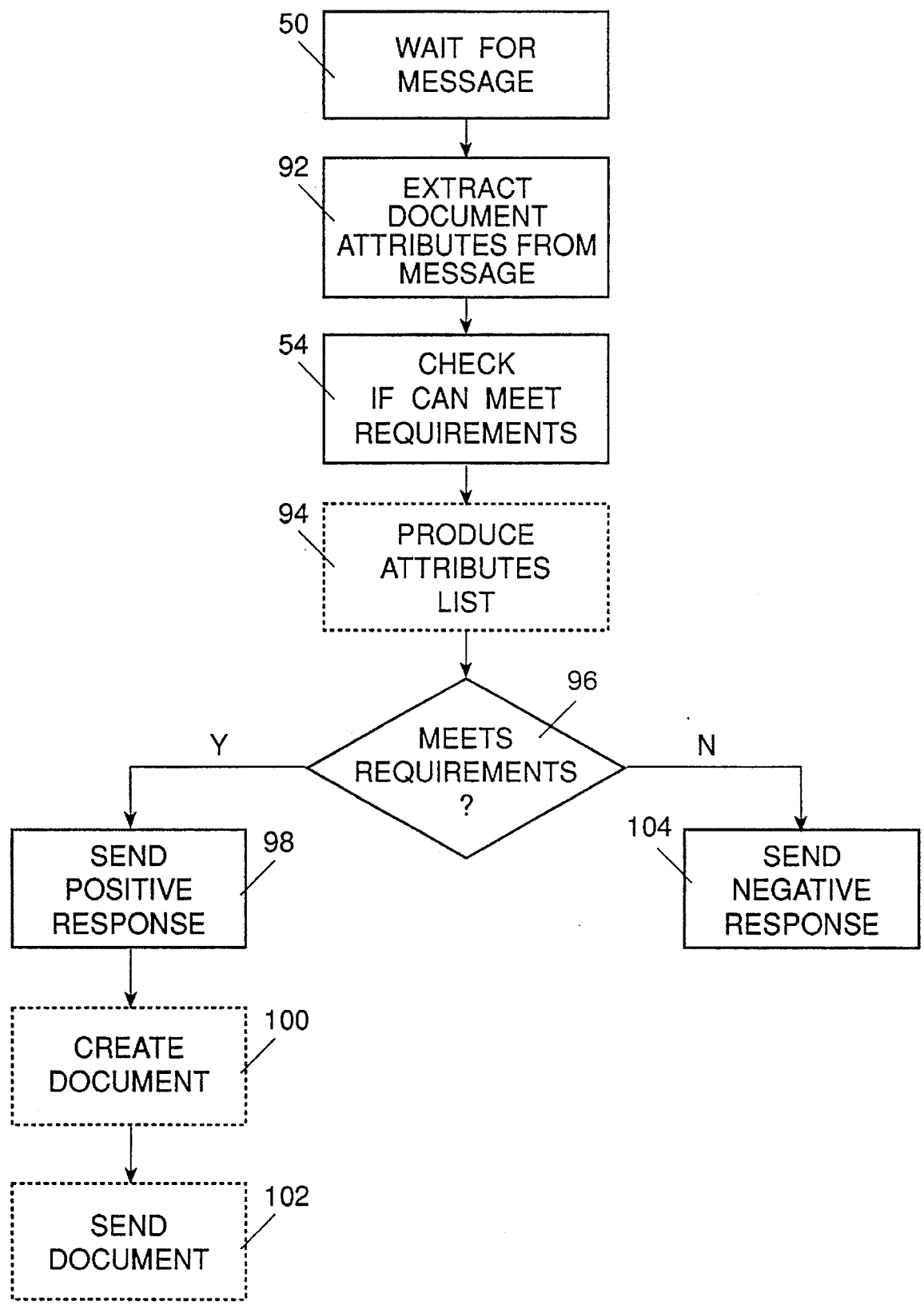

FIGS. 4A and 4B are flow chart illustrations of the protocol of the present invention for the communication between the document handler and the document creator of FIG. 3 where FIG. 4A illustrates the operation of the sending unit and FIG. 4B illustrates the operation of the receiving unit; and Appendix A is a definition of an exemplary protocol syntax, useful in the method of the present invention.

DETAILED DESCRIPTION OF A PREFERRED EMBODIMENT

Reference is now made to FIGS. 1A and 1B which illustrate, in block diagram format, "output" communication for the purposes of producing a physical version of a document, in accordance with a preferred embodiment of the method of the present invention. FIG. 1A illustrates a mode of determining capabilities and FIG. 1B illustrates sending the document data.

In the method of the present invention, when an operator wants to output a document, the document handler 10 on which he is working first communicates with an output system 12 to determine whether or not the output system 12 can produce the document (FIG. 1A). If so, the document handler 10 may send the document data to the output system 12 for production (FIG. 1B). The protocol of the present invention need not be used just for producing documents; it can also be utilized just for determining the capabilities of the output system 12.

In the example of FIGS. 1A and 1B, the output system 12 comprises an output system controller 20 and two plotters 22 and 24 having different document capabilities. The document handler 10 comprises a controller 14. The document to be sent, for example, has the following internal document attributes: four 8 bit color separations each described in the L*a*b* color system, and TIFF format. It has the following external document attributes defined by the operator: 800 dots per inch (dpi) resolution and production required within 1 minute.

After establishing a physical connection, the controller 14 of document handler 10 queries the output system controller 20 if it can plot the document. The output system controller 20, in turn, queries each of plotters 22 and 24 if they can perform the operation. Typically, the query to the plotters 22 and 24 concerns only those capabilities which the plotters 22 and 24 handle. For example, only the attributes of 800 dpi resolution, four 8 bit color separations and the amount of time, of the one minute, within which the plotters can operate, would be sent to the plotters. The remaining attributes, TIFF format, L*a*b* color system and the remaining time, are handled by the output system controller 20.

Plotters 22 and 24 respond to their queries, either as just a yes or no or by indicating their capabilities. For example, plotter 24 might indicate that it has the desired capabilities. If output system controller 20 also has the capabilities desired of it, it sends a positive response to the controller 14. Otherwise, it sends a negative response, even though the plotter 24 has the capabilities desired of it. As will be understood, a positive answer can be provided only if the output system 12 has all of the necessary document handling capabilities.

If the answer from the output system controller 20 is positive, the controller 14 of document handler 10 can send the document data to the output system controller 20 (FIG. 1B) which processes it as necessary. It then sends the processed data to the plotter 24 for plotting.

The responses can have one of two formats. It can be a simple "yes" or "no" or it can additionally state the capabilities of the output system 12. If desired, it can provide those capabilities which are similar to, but do not match, the desired capabilities.

If the answer from the output system controller 20 is negative, the controller 14 tries again, typically with less stringent requirements. For example, if it first requested four 8 bit color separations at 800 dpi resolution, the second request may be for four 8 bit color separations at 400 dpi resolution, afterwards falling back to three 8 bit color separations at 400 dpi resolution, and continually falling back until it reaches the least stringent requirement of 1 bit (black and white) at 50 dpi resolution.

The fallback request of the controller 14 of document handler 10 can be dependent on the information provided by the output system controller 20. If the negative response of controller 20 includes in it the capabilities of the output system 20, controller 14 can utilize the information to produce a more directed second request, thereby minimizing the number of queries.

It will be appreciated that in the method of the present invention, the information regarding a document handling capability resides in the device which has the particular capability. Thus, the system controller 20 does not store any information regarding the capabilities of the plotters 22 and 24; rather, it stores its own capabilities and finds out about the capabilities of the others through queries. As a result, there is no need for the configuration files of the prior art.

It will further be appreciated that the method can be performed between two systems, as shown in FIGS. 1A and 1B, or between sub-systems of a single system.

Figure 2A:
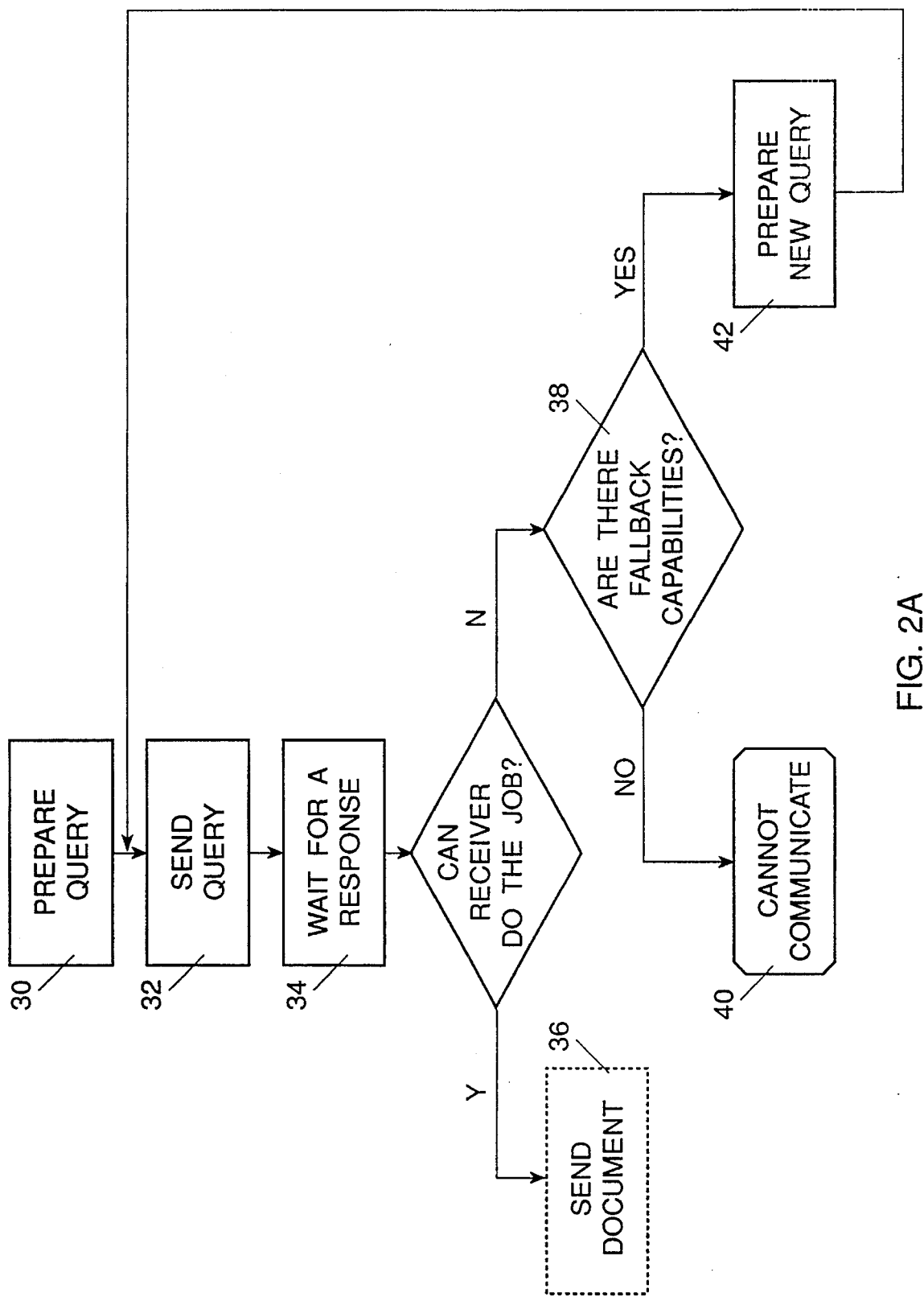
FIGS. 2A and 2B are flow chart illustrations of the protocol of the present invention for the communication between the document handler and the output device of FIGS. 1A and 1B, where
Figure 2B:
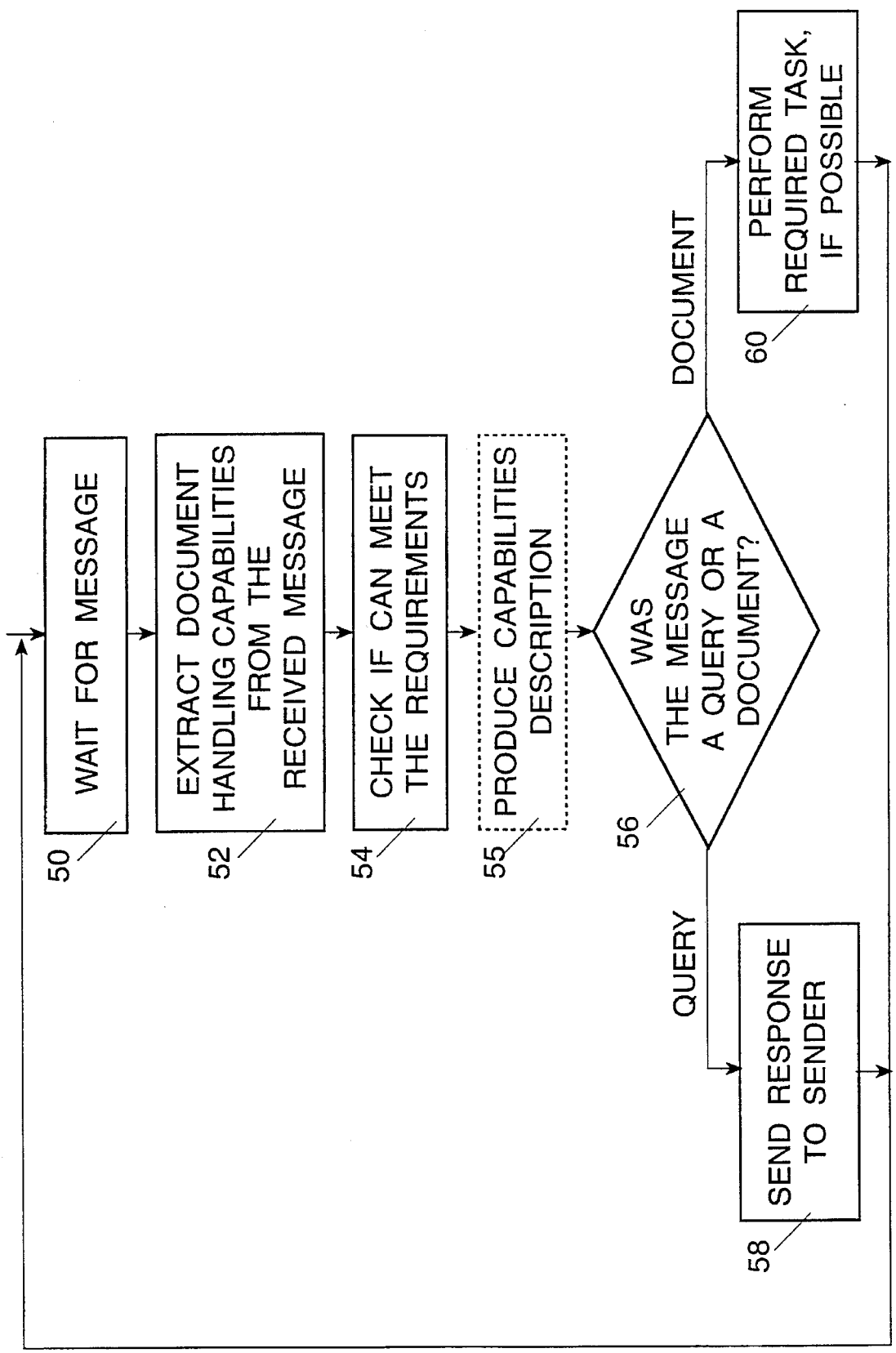

Reference is now made to FIGS. 2A and 2B which respectively illustrate, in flow chart format, the methods performed on a sending and a receiving end of an "output" document transfer, where the sending end prepares the queries and the document data and the receiving end responds to the queries and receives the transferred document data.

It is noted that, prior to performing the methods of FIGS. 2A and 2B, the system controllers 14 and 20 must have established a reliable physical communication. The protocol of the present invention is performed at an application level of the model of communication of the International Standards Organization (ISO).

The sending method (FIG. 2A) begins in step 30 by reviewing the internal and external document attributes and from them, preparing a query describing the desired document handling capabilities. The query can have any syntax which provides the information necessary. An example syntax is provided in Appendix A herein enclosed in which the query is produced as a header with a question mark.

In step 32, the query is sent to the receiving side. In step 34, the sending system waits for a response from the receiving side. The response will either be positive or negative and the method proceeds to steps 36 or 38, respectively, in response thereto. The sending system can perform other actions for other applications while waiting for a response from the receiving side.

In optional step 36 (positive response), the sending system transfers the document. The document typically includes in it the document handling capabilities which were in the successful query.

In step 38 (negative response), the method reviews the received response and determines whether or not some form of communication is still possible. If not, it ends, in step 40.

Otherwise, it prepares a new query (step 42) and the process is repeated from step 32. The new query can be based on the document handling capability information included within the received response. For example, if the output device included the statement "150 dpi", then the maximum resolution of the output device is 150 dpi. The new query can then include the resolution of 150 dpi if that suits the task.

Alternatively, if the response included no information, the query can be the next query in a preset downgrading query sequence.

The receiving system performs the steps of FIG. 2B, as follows. After communication has been established, the receiving system waits, in step 50, for a message which is either a query or the document itself. While waiting for communication, the receiving side can be performing other operations for other applications. In step 52, the requested document handling capabilities are extracted from the message.

In step 54, the receiving system performs whatever actions are necessary to determine whether or not it can handle the task described in the message. Step 54 may involve enquiring of associated sub-systems what their capabilities are and thus, may involve performing the method of FIG. 2A once per sub-system. The messages provided to the sub-systems can either be the message received by the receiving system, portions thereof or other capabilities which are implied by the original message.

Each receiving system and sub-system determines only its own capabilities and it does so by examining its own capability database or hard-wired decision rules and comparing them to the requirements of the message.

Optionally, in step 55, a capabilities description is produced from the information determined in step 54. The description can answer the query exactly, or it can list capabilities of the receiving side.

Once the capabilities of the receiving system and its associated sub-systems have been determined, step 56 is performed which determines if the received message was a query or the document itself. If it was a query, then the receiving system, in step 58, produces a response which includes a positive or negative indication and optionally the capabilities description of step 55. The response is then provided to the sending system. If the message was the document data and the determination of step 54 was positive, then the receiving system, in step 60, performs the task on the document.

Reference is now made to FIGS. 3, 4A and 4B which illustrate the method of the present invention for "input" communication, wherein a document which is created on a document creation system 80 is provided to the document handler 10. The document creation system 80 typically comprises a system controller 82 and an input device, such as a scanner 84.

Since the methods are similar, those elements and steps which are similar to those shown in FIGS. 1A, 1B, 2A and 2B have similar reference numerals.

Prior to requesting receipt of a document, the document handler 10 (FIG. 3) first communicates, in a method similar to that described hereinabove, to determine if the document creation system 80 can produce a document which the document handler 10 can handle. The communication can also simply be for information about the capabilities of the document creation system or it can be for the purposes of receiving a document. The syntax of the query, as shown in Appendix A, determines whether or not the document handler 10 requests production of the document.

If the answer is positive and a document is requested, the document creation system controller 82 indicates to scanner 84 to create the document. Controller 82 provides the document, in due course, to the document handler 10. If the answer is negative, the document handler 10 can either abort the communication or provide desired fallback attributes, as described hereinabove.

The input communication method performed is illustrated in FIGS. 4A and 4B. On the sending side, most of the operations are as described hereinabove. The query is first prepared and sent (steps 30–34). If the document creation system 80 can perform the task and the sending side has indicated in the query that the task is to be performed, then, in step 90, the sending side waits for the document. While waiting, the sending side can perform other tasks. Otherwise, the sending side determines whether or not it has a fallback set of attributes (steps 38–42), as described hereinabove.

On the receiving side, the input communication method is slightly different than the output communication method. As before, the receiving side first waits for a message (step 50), performing other tasks in the meantime. When the message arrives, the receiving side extracts the desired document attributes (step 92) from the message.

As previously described, the receiving side then determines, in step 54, whether or not it can meet the requirements.

In optional step 94, the receiving side produces a list describing attributes that it can provide to a document and document handling capabilities, such as available storage space, that it requires of the sending side. This step is similar to step 55 described hereinabove, with the exception that in step 94 document attributes desired of the document are provided.

In step 96 the receiving side determines whether or not it can produce the desired document. If so, it sends a positive response (step 98) and then, if it was requested to do so, it creates the document (step 100). If the document has been created, the receiving side sends the finished document (step 102) to the sending side.

If the receiving side cannot produce the desired document, it sends a negative response (step 104) and then returns to step 50 to wait for another query.

It will be appreciated that the protocol of the present invention enables input and output communication regarding document attributes and document handling capabilities, without the need for prior configuration of the systems which are communicating. The capabilities may also include ones not specifically related to document formatting, such as production timing.

It will be appreciated by persons skilled in the art that the present invention is not limited to what has been particularly shown and described hereinabove. Rather the scope of the present invention is defined by the claims which follow:

Appendix A

The data sequence is byte oriented in order to avoid presentation inconsistencies, and byte aligned in order to help fast decoding.

--- signs:
    [] — optional
    ... — multiple
definition:
    {?} {!} {+} {−} — defined signals.
    {attribute-tag} — one of defined tags representing an attribute.

---

All signals and attribute-tags are byte aligned, byte oriented and their specific values must be so that any sequence is uniquely decipherable.

---

{attribute values} — data structures and\or sequences defined
                    according to the specific attribute-tag
"Header" is defined as following:
    {H} := ( {attribute-tag} {attribute values} ) ....
"question" is defined as following:

---
-continued

{Q} := {H} {?}
"answer" is defined as following:
    {A} := ({+} or {−}) [{H}] {!}
Valid phrases for the protocol are:
    1. One direction data transfer: {H}{!} [data]
    2. "question": {Q}
    3. "answer": {A}

---

Some possible attributes and examples for attribute values:

---

Document formats or page description language:
    ISO 12087, TIFF, PostScript, Scitex Handshake...
Document size:
    exact XxY in mm or inches, circle, smallest to biggest...
Document resolution:
    R dpi ...
Compression standard or algorithm:
    JPEG, CCITT Group 4, ZIP, Run length...
Color description:
    CIE-Lab, RGB, CMYK ...
Color linear transformation:
    matrix values...
Color non-linear transformation:
    Gamma correction, LUT specification ...
Spatial linear filtering:
    convolution kernel size and values ...
Document crop:
    size, offsets ...
Speed of task execution:
    N minutes, K seconds ...
Actual task description:
    plot, scan, pre-scan, query only ...
Fonts required:
    16pt Roman Bold, default italics ...

---

Attributes will normally refer to the support of other high level standards and formats like formats or page description languages.

Low level attributes, like size, fonts capabilities etc. can be used, but the main idea is to coordinate existing capabilities and not to create new formats or standards of document description. Those low level attributes may be required when a supported standard lacks certain attributes within its definition, e.g. JPEG does not specify the color space.

Attribute-values are designed to either specify a value or range of values as was shown in the examples above, or signal "don't care" mainly for requesting the other side to specify its capability regarding this attribute.

The actual structure of the attribute-value may depend on the proceeding attribute tag. As an example, the "Document formats or page description language" attribute tag will be followed by a sequence:

{values field length (4 bytes)}, {an integer (length=4 bytes)}

Where the integer value represents the following:
    0—"don't care" or "please specify"
    1—ISO 12087
    2—TIFF
    3—PostScript
    4—Scitex Handshake

I claim:

1. A method of coordinating the transfer of documents from a first system to a second system, wherein each document includes document data and document attributes, comprising the steps of:

forming a query in said first system which includes a list of document handling capabilities desired in said second system, wherein at least some of said document handling capabilities are based on said document attributes;

sending said query from said first to said second system;

determining in said second system the document handling capabilities of said second system and providing a response to said first system indicating whether said second system has said desired document handling capabilities;

modifying said query in said first system, if said response is negative, to include a list of fallback document handling capabilities and repeating said step of sending said query and said step of determining the document handling capabilities of said second system; and repeating said step of modifying said query until said response is positive or until said list of fallback document handling capabilities is exhausted.

2. The method of claim 1, wherein said response includes a list of document handling capabilities of said second system as determined in said step of determining the document handling capabilities of said second system.

3. The method of claim 1, further comprising the step of sending said document from said first system to said second system if said response is positive.

4. The method of claim 1, wherein said second system includes a system controller and at least one subsystem, said step of forming a query, said step of sending said query and said step of determining the document handling capabilities of said second system are performed between said system controller and each of said at least one subsystem.

5. A method of coordinating the inputting of documents from a first system to a second system, wherein each document includes document data and document attributes, comprising the steps of:

forming a query in said first system which includes a list of said document attributes desired to be produced by said second system;

sending said query from said first to said second system;

determining in said second system which document attributes said second system can produce and providing a response to said first system indicating whether said second system can produce said desired document attributes;

modifying said query in said first system, if said response is negative, to include a list of fallback document attributes and repeating said step of sending said query and said step of determining which document attributes said second system can produce; and repeating said step of modifying said query until said response is positive or until said list of fallback document attributes is exhausted.

6. The method of claim 5, wherein said response also includes a list of the document attributes determined in said step of determining which document attributes said second system can produce.

7. The method of claim 5, further comprising the step of sending said document from said first system to said second system if said response is positive.

* * * * *